J. A. PERKINS.
ROLLER BEARING CAGE.
APPLICATION FILED OCT. 27, 1910. RENEWED MAR. 21, 1916.
1,202,576.
Patented Oct. 24, 1916.
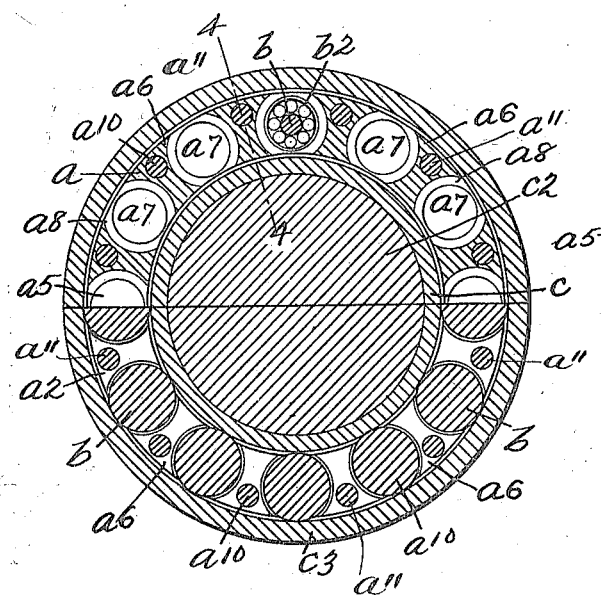
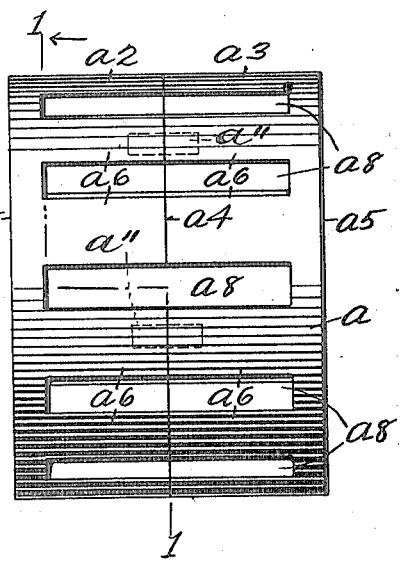
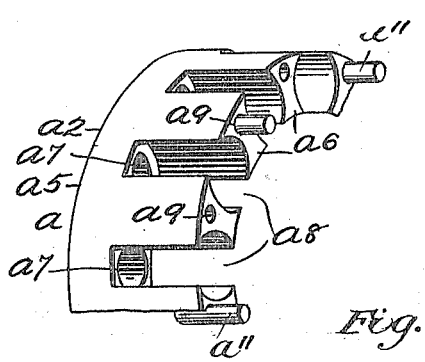
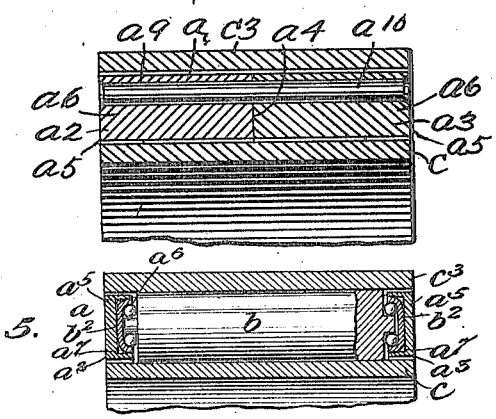
Attest:
G. Robert Thomas
F. Ellis Browne
Inventor:
Julius A. Perkins
by J. Ellis Lassley
Atty

UNITED STATES PATENT OFFICE.

JULIUS A. PERKINS, OF OMAHA, NEBRASKA.

ROLLER-BEARING CAGE.

1,202,576.

Specification of Letters Patent.

Patented Oct. 24, 1916.

Application filed October 27, 1910, Serial No. 589,373. Renewed March 21, 1916. Serial No. 85,743.

*To all whom it may concern:*

Be it known that I, JULIUS A. PERKINS, a citizen of the United States of America, and residing at Omaha, in the county of Douglas and State of Nebraska, have invented certain new and useful Improvements in Roller-Bearing Cages, of which the following is a specification, such as will enable those skilled in the art to which it appertains to make and use the same.

This invention relates to roller bearings, and the object thereof is to provide a strong, rigid, simple, and cheaply constructed cage of rollers, as a unit, wherein the rollers are irremovably arranged, thus permitting the entire device to be stored, handled, shipped, and installed, without danger of loss or dislodgment of any of the parts, and obviating the necessity for assembling for installation, with a consequent freedom from the carelessness and inaccuracy of unskilled persons, and positively insuring the original factory adjustment of parts.

A further object is to provide roller alining means, also similarly sealed in the cage, of circular form and revoluble with the rollers but at a much slower speed in similarly formed recesses therefor, whereby a slight looseness and flexibility results, and thus avoids the localizing of wear of either the said means or the cage, said means being preferably made of metal and of a degree of hardness different from that of the cage.

A further object is to reduce to a minimum the length of the cage, without lessening its strength and rigidity, through reducing the diameter of the roller alining means to less than the radial width of the cage end-plates, and reducing the longitudinal width of the said end-plates, thereby surrounding the roller alining means with metal of the cage ends and of the recessed members connecting the ribs with the cage ends, except the face thereof presented to the corresponding roller-end, thus removing the said alining means from any possibility of accident.

My invention is fully set forth in the following specification, of which the accompanying drawings form a part, in which the separate parts are designated by the same reference characters in each of the views, and in which:—

Figure 1 is a sectional view, on the line 1—1 of Fig. 2 of my invention in position for use; Fig. 2 is an elevation of the cage alone; Fig. 3 is a fragmentary, perspective view of one of the cage elements; Fig. 4 is a section on the line 4—4 of Fig. 1; and Fig. 5 is a central section, similar to Fig. 4, but taken through one of the load rollers.

In the drawings forming a part of this application I have shown a cage $a$ carrying a plurality of rollers $b$ interposed between a journal $c$ upon an axle $c^2$ and an outer bearing member $c^3$, and my present cage, in the form of embodiment shown, consists of two exactly similar elements $a^2$ and $a^3$ joined upon a line $a^4$ in the cage center.

Each of the cage elements $a^2$ and $a^3$ comprises an end plate $a^5$ having a plurality of integral ribs $a^6$ thereon, the contiguous sides of said ribs being segmental in exterior conformation and concentric with the rollers therebetween, and at the bases of the said ribs I provide recesses $a^7$ of a diameter materially less than that of the rollers, said recesses being formed in members interposed between the ribs and the end plates $a^5$ and being concentric with the roller spaces $a^8$ but, as clearly shown, the peripheries of the cage elements, in the positions of the said recesses, are intact, said recesses not projecting therethrough.

In the form shown the ribs of each cage element project to a point midway of the cage itself, and are squared at their ends to form a clean joint, and said ribs are provided with a longitudinal passage therein or therethrough, as shown at $a^9$, for the reception of tie rods $a^{10}$, which are riveted or otherwise secured in the cage to hold the elements thereof together, but I prefer to employ a relatively small number of the said tie rods and substitute dowels $a^{11}$ in one element adapted to enter the passages $a^9$ in the other element.

The rollers $b$ are preferably provided with anti-frictional end guides $b^2$ in the form of cups having balls interposed between the same and the roller end, and it will be noted that the said guides are circular in form and loosely seated in the recesses $a^7$ thus permitting their rotation therein and permitting also a degree of radial movement of the rollers whereby they may adapt themselves to imperfections, inequalities, or extraneous matter, upon either the journal or the outer bearing member.

My present cage is in all respects similar to the one described in a concurrent application with the exception that I join the projections shown in the latter form and thus provide a solid recessed, or rather continuous recessed, member on each of the end-plates which partially or entirely relieves the said end-plates of the strain of cage weight and roller alinement, this being taken by the said members, and I may, therefore, reduce the thickness of the end-plates to practically wafer thinness, thus shortening the cage to little more than the length of the rollers and alining means, this not being possible in any cages now known to me. Further, the cage weight and strain of roller alinement are taken in a plane at right angles to the axes of the rollers through the roller pintles, the anti-friction means, when employed, the alining means, and the inwardly directed members of the cage end-plates and, the said alining means being revoluble in their recesses, the contact thereof with the cage is a rolling one and no wear can result from such contact, and the points of weight or strain sustenance are constantly changing, both in the cage recesses and on the alining means. When my cage of rollers and alining means is assembled there is no possibility of the dislodgment of any of the parts thereof except by actual cage destruction, absolute rigidity is insured, and I provide a very simple, inexpensive, and practical construction permitting the greatest roller dimensions for a given space possible to roller bearing cages of this type.

In the present application I have shown the roller alining means entirely inclosed by the metal of the cage, as distinguished from the form of construction shown in a concurrent application, the reason for which is, as stated, to accommodate the bearing to spaces of limited length without reducing the length or strength of the rollers.

Having fully described my invention, what I claim as new, and desire to secure by Letters Patent, is:—

1. In a bearing, a cage comprising end plates and connecting ribs, said end plates being provided with circular recesses, rollers in said cage in the positions of said recesses, a circular bearing block at each end of each of said rollers revoluble in corresponding recesses, and a series of balls interposed between each roller end and corresponding bearing block.

2. In a bearing, a cage comprising end plates and connecting ribs, said end plates being provided with circular recesses, rollers in said cage in the positions of said recesses, a bearing block at each end of each of said rollers revoluble in corresponding recesses, and a series of balls interposed between each roller end and corresponding bearing block, said cage, rollers, bearing blocks, and balls, forming a unit.

3. In a bearing, a cage, rollers therein provided with a pintle at each end of each roller, a bearing block at each end of each of said rollers revoluble in said cage, and balls interposed between each of said rollers, its pintles, and its bearing blocks.

4. In a bearing, a cage comprising end plates and connecting ribs, rollers therein provided with a pintle at each end thereof, a bearing block on each of said pintles revoluble in said cage, and balls interposed between each of said rollers, its pintles, and its bearing blocks, the peripheries of said cage end plates being intact or unbroken whereby the weight of said cage and the alining of said rollers is taken thereby through said bearing blocks, pintles, and centers of said balls.

5. In a bearing, a cage comprising end plates and connecting ribs, said ribs being divided intermediate the length thereof and the divisions thereof being integral with corresponding end plates, rollers in said cage provided with pintles at the ends thereof, a bearing block on each pintle revoluble in said cage, and balls interposed between each of said rollers, its pintles, and its bearing blocks.

6. In a bearing, a cage comprising end plates and connecting ribs, rollers therein provided with pintles at the ends thereof, a bearing block revoluble in said cage on each of said pintles, and balls interposed between said rollers, their pintles, and their bearing blocks, said ribs being concaved on adjacent sides to prevent the escape of said rollers from said cage.

In testimony that I claim the foregoing as my invention I have signed my name in presence of the subscribing witnesses this 20th day of October, 1910.

JULIUS A. PERKINS.

Witnesses:
 GEO. E. MINER,
 F. ELLIS BROWNE.